(12) United States Patent  
Schwarz

(10) Patent No.: US 6,990,830 B2  
(45) Date of Patent: Jan. 31, 2006

(54) SYSTEM AND METHOD FOR SUPPLYING CONSUMERS WITH HEAT ENERGY OR WITH COOLING ENERGY

(75) Inventor: Alois Schwarz, Kirchdorf (AT)

(73) Assignee: Entech Energie Management GmbH, Kufstein (AT)

( * ) Notice: Subject to any disclaimer, the term of this patent is extended or adjusted under 35 U.S.C. 154(b) by 32 days.

(21) Appl. No.: 10/759,342

(22) Filed: Jan. 16, 2004

(65) Prior Publication Data

US 2004/0144126 A1 Jul. 29, 2004

Related U.S. Application Data

(63) Continuation of application No. PCT/AT02/00190, filed on Jun. 28, 2002.

(30) Foreign Application Priority Data

Jul. 26, 2001 (AT) .............................. A 1168/2001

(51) Int. Cl.  
*F25D 17/02* (2006.01)

(52) U.S. Cl. ................... 62/434; 237/2 B; 237/8 R; 165/10

(58) Field of Classification Search ................. 62/430, 62/434, 201; 165/10, 902; 237/2 B, 8 R  
See application file for complete search history.

(56) References Cited

U.S. PATENT DOCUMENTS

| | | | | |
|---|---|---|---|---|
| 2,893,218 A | * | 7/1959 | Harnish | ........................ 62/180 |
| 3,675,441 A | * | 7/1972 | Perez | ........................... 62/278 |
| 4,173,125 A | * | 11/1979 | Bradshaw | ........................ 62/79 |
| 4,196,595 A | * | 4/1980 | Shaw | ........................... 62/160 |
| 4,254,636 A | | 3/1981 | Zebuhr | |
| 4,265,223 A | * | 5/1981 | Miserlis et al. | .............. 126/592 |
| 4,299,277 A | * | 11/1981 | McGregor | .................. 165/48.2 |
| 5,788,149 A | * | 8/1998 | Schwarz | ..................... 237/2 B |
| 6,062,035 A | * | 5/2000 | Ueno | ......................... 62/324.1 |
| 6,205,795 B1 | * | 3/2001 | Backman et al. | .............. 62/79 |

FOREIGN PATENT DOCUMENTS

| | | |
|---|---|---|
| CH | 636 948 A5 | 6/1983 |
| EP | 0 002 839 A1 | 7/1979 |
| EP | 0 017 975 A1 | 10/1980 |
| EP | 0 711 958 A1 | 5/1996 |
| GB | 2 014 297 A | 8/1979 |

* cited by examiner

*Primary Examiner*—William C. Doerrler  
(74) *Attorney, Agent, or Firm*—Laurence A. Greenberg; Werner H. Stemer; Ralph E. Locher

(57) ABSTRACT

A system and method supplies users with heat energy or cooling energy via a carrier medium. At least one source of heat energy or chilling energy has an output line that is connected to the input of at least one controllable distributor device. The distributor has a number of outlets, to which the supply lines for users are connected to heating or cooling supplies at various temperature levels. Any of the users may be selected by the distribution device, for supplying carrier medium at the required temperature. At least one heat reservoir is connected in parallel to at least one part of the user for heat energy at different temperature levels, in which the excess heat energy at the given temperature level may be stored and from which the heat energy contained therein may be extracted and supplied to the user with the relevant temperature level.

8 Claims, 1 Drawing Sheet

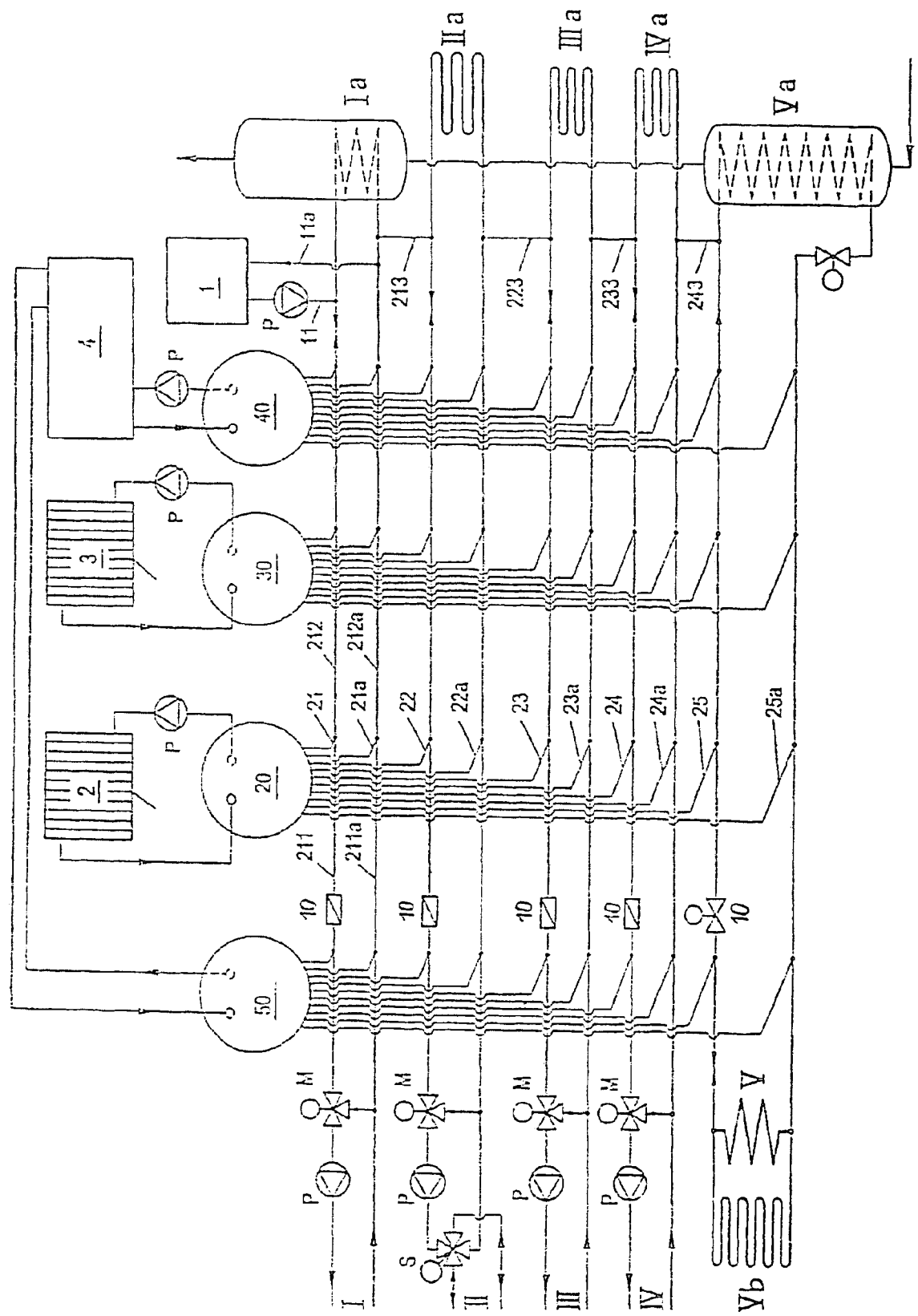

SYSTEM AND METHOD FOR SUPPLYING CONSUMERS WITH HEAT ENERGY OR WITH COOLING ENERGY

CROSS-REFERENCE TO RELATED APPLICATION

This application is a continuation of copending International Application No. PCT/AT02/00190, filed Jun. 28, 2002, which designated the United States. The application also claims the benefit under 35 U.S.C. § 119 of Austrian patent application A 1168/2001, filed Jul. 26, 2001; these disclosures are herewith incorporated by reference in their entirety.

BACKGROUND OF THE INVENTION

FIELD OF THE INVENTION

The present invention relates to a system and to a method for supplying consumers with heat energy or with cooling energy by means of a transfer medium, having at least one source for heat energy or for cooling energy, the output line of which source is placed at the input to at least one controllable distributor device which is assigned to said source and which is designed with a multiplicity of outputs to which the forward-flow lines to consumers of heat energy or of cooling energy at different temperature levels are connected, it being possible for the distributor device to select one of the consumers to which transfer medium at the required temperature level can be supplied.

A system of that type is disclosed in my earlier U.S. Pat. No. 5,788,149 and the corresponding European patent EP 0711958 B1. In that earlier system, the consumers of heat energy or of cooling energy at different temperature levels are connected in series. This enables the heat energy which is not required by a consumer at a given temperature level to be passed on in each case to the consumer which is connected downstream of it and has a lower temperature level. The heat energy which is not required by any of the consumers connected in series and having different temperature levels is finally output to a heat reservoir, from which the heat energy is drawn off and raised again, by means of a heat pump, to such a temperature level that it can be supplied to one of the consumers having a high temperature level.

The prior art system does not therefore entirely meet the requirements, as the heat energy which has a given temperature level and is not immediately required in the associated consumer is supplied to the consumer that is connected downstream and has a lower temperature level. Since the temperature of that heat energy is reduced as a result, it is consequently no longer available with the consumers having a higher temperature level.

SUMMARY OF THE INVENTION

It is accordingly an object of the invention to provide a device and a method for supplying heat energy or cooling energy to consumers, which overcomes the above-mentioned disadvantages of the heretofore-known devices and methods of this general type and which provides a system of this type that allows that thermal energy which is at a given temperature level and is not immediately required by the associated consumer can also be supplied to said consumer at a later time, namely as soon as it is required With the foregoing and other objects in view there is provided, in accordance with the invention, a system for supplying consumers with heat energy or with cooling energy, comprising:

at least one source for heat energy or for cooling energy, and an output line communicating with said source;

a controllable distributor device with an input connected to said output line of said source and with a plurality of outputs connected to forward-flow lines for selectively supplying heat or cooling energy via a transfer medium at mutually different temperature levels to a given consumer at a respectively required temperature level;

at least one heat reservoir connected in parallel with each of a plurality of the consumers at mutually different temperature levels, wherein said heat reservoir is configured to store excess heat energy at a given temperature level and to supply heat energy content contained therein to the consumer at the given temperature level.

In other words, the objects of the invention are achieved by the fact that at least one heat reservoir is connected in parallel in each case with at least some of the consumers for heat energy at different temperature levels, it being possible for the excess heat energy to be stored in said heat reservoir at the given temperature level and for the heat energy contained therein to be removed from it and to be supplied to the consumer at the relevant temperature level.

Preferably, a plurality of consumers for heat energy at different temperature levels are provided in a manner known per se, a heat reservoir being connected in parallel with each of these consumers. Furthermore, the source for cooling energy is preferably formed in a manner known per se by at least one environmental collector and by a heat pump, and a store for cooling energy is likewise assigned to the at least one consumer for cooling energy.

According to one preferred embodiment, shut-off valves are connected between the forward-flow lines for feeding heat energy and cooling energy into the associated consumers. This enables heat energy to be placed into the system and stored therein and also enables cooling energy to be supplied to the consumers in order to bring about air conditioning. Reversing valves are preferably connected into the forward-flow lines for feeding heat energy and cooling energy into walls, said reversing valves being used to supply the walls with heat energy from below and cooling energy from above.

According to a furthermore preferred embodiment, lines directly connecting the consumers for different temperature levels, which consumers are connected in series between the return lines and the forward-flow lines, are provided, and the forward-flow line of the distributor device can be connected to the forward-flow line of the consumer having the highest temperature level and the return line of the distributor device can be connected to the return line of the consumer having the lowest temperature level. According to the method according to the invention, the thermal energy which is output by the source for heat energy or for cooling energy and which is not required by the consumers is output to at least one of the thermal stores connected in parallel with the consumers of different temperature level and is stored in said store, and, if the need arises, in particular after a heating furnace located in the system or the heat pump is switched off, thermal energy is removed from the store and supplied to consumers.

The text herein refers to supplying "heat energy" and supplying "cooling energy." In purely thermodynamic terms, of course, supplying cooling energy is to be understood as removing heat energy or heat content from a system. The underlying changes, by convention, are parameterized with +Q and −Q and the corresponding entropy changes of the systems—here, consumers—are substantially equal and opposite as well.

Other features which are considered as characteristic for the invention are set forth in the appended claims.

Although the invention is illustrated and described herein as embodied in a system and method for supplying consumers with heat energy or with cooling energy, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The sole FIGURE of the drawing is schematic illustration of a system according to the invention.

DESCRIPTION OF THE PREFERRED EMBODIMENTS

Referring now to the FIGURE of the drawing in detail, a system according to the invention contains a plurality of devices for outputting heat energy or cooling energy, namely a heating furnace 1, two solar or environmental collectors 2 and 3 and a heat pump 4. Heat energy or cooling energy at different temperature levels is output by these devices 1 to 4 by way of a heat transfer medium. In this case, heat energy at a temperature in the range of from 95° C. to 30° C. is output by the heating furnace 1, heat energy or cooling energy in the range of 100° C. to −40° C. is output by the collectors 2 and 3 as a function of the climatic conditions and heat energy or cooling energy of 50° C. to −20° C. is output by the heat pump 4.

A plurality of consumer circuits I to V which require different temperature levels are connected to the producers of heat energy or of cooling energy. These constitute a first heating circuit I for a space heating system, for example using radiators, furthermore a second heating circuit II for an inside-wall heating system, furthermore a third heating circuit III for a floor heating system, furthermore a fourth heating circuit IV for an outside-wall heating system and finally a cooling system V and a cold reservoir Vb.

The heating furnace 1 is connected via lines 11 and 11*a* only to the first consumer circuit I for the space heating system. In contrast, the collectors 2 and 3 and the heat pump 4 are connected via distributor devices 20, 30, 40 and 50 to the consumer circuits I to V. Thus, the distributor device 20 is connected via a forward-flow line 21 and a return line 21*a* to the consumer circuit I and via further forward-flow lines 22 to 25 and return lines 22*a* to 25*a* to the consumer circuits II to V. The distributor devices 30, 40 and 50 are also connected to the consumer circuits I to V in the same manner.

The heat energy or cooling energy made available by the heat generators or cold generators through the distributor devices 20, 30, 40 and 50 and having different temperature levels is supplied in each case to the particular consumer circuit I to V in which the relevant temperature level is required. For this purpose, mixing devices M and pumps P are provided in the individual consumer circuits.

The transfer medium is supplied by the distributor devices 20, 30, 40 and 50, as a function of the temperature which the transfer medium output by the associated heat source or cold source has, via one of the forward-flow lines to the particular consumer circuit which is set to the temperature level. The pump P which is provided in the relevant consumer circuit is used to supply the transfer medium via a mixer M to the at least one consumer which is located in this circuit. The return from this consumer is connected, on the one hand, to the mixer and takes place, on the other hand, via the associated return line, via which the cooled transfer medium is conducted further.

If, in a system of this type, the heat energy supplied to one of the consumer circuits is not required at the corresponding temperature level, it is not, however, conducted further to the consumer circuit which is connected downstream and has a lower temperature level, but rather it is stored at this temperature level. For this purpose, at least one storage device Ia to Va, in which that portion of heat energy or of cooling energy which is not required in the associated consumer circuit I to V is stored, is connected to the distributor devices 20, 30 and 40 in parallel with the consumer circuits I to V. As soon as heat energy at the required temperature level is therefore no longer supplied by one of the distributor devices to the relevant consumer circuit, since it is not made available by the associated heat source, the relevant forward-flow line is closed and the pump P located in this consumer circuit feeds in heated transfer medium from the associated store. Accordingly, the heat energy having the given temperature level required for this consumer is removed from the store assigned to this consumer circuit. The same also applies to the cooling energy.

As can be seen from the drawing, the heating furnace 1 is connected via the lines 11 and 11*a* only to the heating circuit I and to a boiler Ia for hot water. The heating circuit I is supplied by the collectors 2 and 3 and, if the need arises, by the heat pump 4 provided that they output heat energy at the required temperature level. Excess heat energy occurring in this case is stored in the boiler Ia. If the required heat energy is not made available by the collectors 2 and 3, it is referred from the heating furnace 1. Heat energy output by the latter is likewise stored in the boiler Ia. As soon as the heating furnace 1 has been switched off and heat energy continues to be required in this consumer circuit, this heat energy is taken from the boiler Ia. This produces a decisive reduction in the number of times that the heating furnace 1 is switched on and off, as a result of which the requirements in this respect in terms of instructions relating to environmental protection are satisfied.

The operation of the system is explained below with reference to the environmental collector 2 and the devices connected downstream of the latter:

The transfer medium output by the collector 2 is supplied by the distributor device 20 as a function of the temperature of said medium via the forward-flow lines 21 to 25 to one of the consumer circuits I to V. For example, the distributor device 20 outputs transfer medium at a temperature of approximately 70° via the forward-flow line 21 to the forward-flow lines 211 and 212 of the first consumer circuit I. The transfer medium passes via the forward-flow line 211 into the consumer circuit I having space heaters and passes via the line 212 into the store Ia. The cooled transfer medium can return via the lines 211a and 212a to the return line 21a and to the distributor device 20.

However, as soon as there is no longer any flow from the distributor device 20 into the consumer circuit I, the required heat energy is supplied to the consumer circuit I from the store Ia via the lines 212 and 211. The consumer circuit I is therefore supplied with heat energy from the boiler Ia. In an analogous manner, heat energy at a temperature of approximately 40° C. is supplied to the consumer circuit II and to the store IIa assigned thereto, heat energy at a temperature of approximately 30° C. is supplied to the consumer circuit III and the store IIIa, heat energy at a temperature of approximately 20° C. is supplied to the consumer circuit IV and to the store IVa, and thermal energy at a temperature of approximately 12° C. is supplied to the consumer circuit V by the boiler Va.

In the situation in which, in contrast, heat energy is no longer required in the consumer circuit I and in the consumer Ia, the distributor device 20 can be adjusted in such a manner that although the forward flow takes place via the line 21, in which case the transfer medium passes through the boiler Ia, the return takes place via the line 25a. In order to make this possible, the line 212a is connected via a connecting line 213 to the forward-flow line of the consumer circuit II, and the further consumer circuits III, IV and V are also connected to one another via the lines 223, 233 and 243. This means that the transfer medium passes through all of the consumer circuits I to V, in which case it outputs the heat energy contained in it to the consumers or to the stores having a lower temperature level in each case. Since it is returned in this manner via the return line 25a at a very low temperature back to the collectors 2 and 3, a very high degree of efficiency is thereby obtained in them.

The feeding of the consumer circuits II to IV and of the stores IIa to IVa by the environmental collector 3 and by the heat pump 4 also takes place in an analogous manner via the distributor devices 30 and 40. For the situation in which, in one of the consumer circuits or one of the associated stores, heat energy at the temperature level corresponding to these consumer circuits or stores is not required, the consumer circuits II to V are also connected to one another via the lines 223, 233 and 243.

Cooling energy can also be output by the environmental collectors 20 and 30 and by the heat pump 40. Cooling energy is conducted by the distributor devices 20, 30, 40 and 50 via the forward-flow lines into the cooling space V or into the cold store Vb and stored in the latter. The cooling energy which is stored in the cold store Vb and also the cooling energy which is output by the heat pump 4 can be output via the distributor device 50 to one of the consumer circuits I to IV, it being used to cool the rooms, the inside walls and floors. For this purpose, shut-off valves 10 are arranged in the consumer circuits I to IV and can be used, in the event of air conditioning taking place, to separate the consumer circuits I to V into two regions in each case, as a result of which at the same time cooling can take place in the consumer circuits I to IV and heat energy can be stored in the stores Ia and Va.

Since the supplying of a wall heating system with heat energy has to take place in such a manner that the heat energy is supplied to the lower end of the wall, whereas cooling has to take place in such a manner that the cooling energy is supplied to the upper end of the wall, a control valve S is also provided in the consumer circuit II and can be used for the control required for this.

If the distributor devices 20 and 30 are appropriately controlled, they can also be used to conduct heated transfer medium from the consumer circuits I to V via the forward-flow lines 21, 22, 23 and 24 and through the collectors 2 and 3 in order to free the latter from snow or ice.

If heat energy is supplied to the consumer circuit V, said heat energy is conducted into the boiler Va in which water is heated, the hot water consequently being conducted into the boiler Ia, from which heated water for use can be removed.

The distributor device 50 can be used to remove heat energy from one of the consumer circuits II to V, said heat energy being supplied to the heat pump 4. The heat energy produced in the heat pump 4 can be supplied via the distributor device 40 to one of the consumer circuits I to V. In addition, the cooling energy produced by the heat pump 4 can be supplied via the distributor device 50 to one of the consumer circuits I to V.

I claim:

1. A system for supplying consumers with heat energy or with cooling energy, comprising:
   at least one source for heat energy or for cooling energy, and an output line communicating with said source;
   a controllable distributor device with an input connected to said output line of said source and with a plurality of outputs connected to forward-flow lines for selectively supplying heat or cooling energy via a transfer medium at mutually different temperature levels to a given consumer at a respectively required temperature level;
   a plurality of heat reservoirs each respectively connected in parallel with a respective one of a plurality of the consumers at mutually different temperature levels, wherein said heat reservoirs are configured to store excess heat energy at mutually different temperature levels and to supply heat energy content contained therein to the respectively connected consumer at the given temperature level.

2. The system according to claim 1, wherein each of the plurality of consumers for heat energy at the mutually different temperature levels has a respective said heat reservoir connected in parallel therewith via respective consumer circuits.

3. The system according to claim 1, wherein said source for cooling energy is an exchanger device selected from the group consisting of at least one environmental collector and a heat pump, and wherein a reservoir for cooling energy is connected in parallel to a respective consumer of cooling energy.

4. The system according to claim 1, which comprises shut-off valves connected between the forward-flow lines for feeding heat energy and cooling energy to the respectively associated consumers.

5. The system according to claim 1, wherein one of the consumers is a wall, and wherein reversing valves are connected into the forward-flow lines for feeding heat energy and cooling energy into the walls, and said reversing valves are configured to supply the heat energy into the walls from below and to supply the cooling energy into the walls from above.

6. The system according to claim 1, which comprises plurality of consumer circuits each with a forward-flow line and a return line, and lines directly connecting said consumer circuits via said return lines and said forward-flow lines, are provided, whereby a forward-flow line of said distributor device is connectible to the forward-flow line of said consumer circuit having a highest temperature level and a return line of said distributor device is connectible to the return line of the consumer circuit having a lowest temperature level.

7. A method for supplying consumers with heat energy or with cooling energy which comprises:
- connecting a plurality of consumers to the system according to claim 1;
- outputting heat energy from the source and selectively supplying heating energy and cooling energy to the consumers;
- storing thermal energy not required by the consumers in at least one of the thermal reservoirs connected in parallel with the consumers of different temperature level, and supplying the thermal energy to the consumers upon demand.

8. The method according to claim 7, which comprises using the thermal reservoir as the source when a heating furnace or a heat pump located in the system is switched off.

* * * * *

UNITED STATES PATENT AND TRADEMARK OFFICE
CERTIFICATE OF CORRECTION

PATENT NO. : 6,990,830 B2  Page 1 of 1
DATED : January 31, 2006
INVENTOR(S) : Alois Schwarz It is certified that error appears in the above-identified patent and that said Letters Patent is hereby corrected as shown below:

<u>Title page,</u>
Item [73], Assignee, should read -- EnTech Energie Management GmbH. Kufstein (AT) --.

Signed and Sealed this

Eleventh Day of April, 2006

JON W. DUDAS
*Director of the United States Patent and Trademark Office*